United States Patent
Cai et al.

(10) Patent No.: US 9,451,611 B2
(45) Date of Patent: Sep. 20, 2016

(54) SYSTEM AND METHOD FOR CONTROLLING MULTIPLE WIRELESS ACCESS NODES

(71) Applicant: Futurewei Technologies, Inc., Plano, TX (US)

(72) Inventors: Yegui Cai, Ottawa (CA); Fei Richard Yu, Ottawa (CA); Gamini Senarath, Ottawa (CA); Halim Yanikomeroglu, Ottawa (CA)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 109 days.

(21) Appl. No.: 14/292,483

(22) Filed: May 30, 2014

(65) Prior Publication Data

US 2014/0355535 A1    Dec. 4, 2014

Related U.S. Application Data

(60) Provisional application No. 61/829,469, filed on May 31, 2013.

(51) Int. Cl.
| | |
|---|---|
| *H04W 72/04* | (2009.01) |
| *H04B 7/02* | (2006.01) |
| *H04W 52/24* | (2009.01) |
| *H04W 72/08* | (2009.01) |

(52) U.S. Cl.
CPC ......... *H04W 72/0433* (2013.01); *H04B 7/024* (2013.01); *H04W 52/244* (2013.01); *H04W 72/082* (2013.01)

(58) Field of Classification Search
CPC . H04L 5/0035; H04L 5/0073; H04L 1/0693; H04L 29/08594; H04L 67/142; H04L 1/002; H04W 64/006; H04W 72/0433
See application file for complete search history.

(56) References Cited

U.S. PATENT DOCUMENTS

| | | | |
|---|---|---|---|
| 2009/0158358 A1* | 6/2009 | Yu | H04N 21/44227 725/62 |
| 2012/0113816 A1* | 5/2012 | Bhattad | H04L 5/0032 370/246 |
| 2012/0155366 A1* | 6/2012 | Zirwas | H04B 7/024 370/312 |
| 2013/0003788 A1 | 1/2013 | Marinier et al. | |

(Continued)

FOREIGN PATENT DOCUMENTS

WO    2012175360 A1    12/2012

OTHER PUBLICATIONS

PCT International Search Report and Written Opinion, PCT/US2014/040373, Applicant: Huawei Technologies Co., Ltd., dated Oct. 15, 2014, 9 pages.

(Continued)

*Primary Examiner* — Benjamin H Elliott, IV
(74) *Attorney, Agent, or Firm* — Slater Matsil, LLP

(57) ABSTRACT

In one embodiment, method for controlling multiple wireless access nodes includes receiving, by a central controller from a base station (BS), a message indicating a channel state information (CSI) and determining a state transition function in accordance with the message. The method also includes determining a belief state in accordance with the state transition function and determining cooperation for a plurality of BSs including the BS in accordance with the belief state to produce a cooperation decision. Additionally, the method includes transmitting, by the central controller to the BS, the cooperation decision.

28 Claims, 13 Drawing Sheets

(56) References Cited

U.S. PATENT DOCUMENTS

| | | | |
|---|---|---|---|
| 2014/0022925 A1* | 1/2014 | Cili | H04W 24/08 370/252 |
| 2014/0161054 A1* | 6/2014 | Sandberg | H04B 7/0452 370/329 |
| 2014/0192744 A1* | 7/2014 | Zhou | H04B 7/024 370/329 |
| 2014/0355535 A1* | 12/2014 | Cai | H04W 72/0433 370/329 |

OTHER PUBLICATIONS

Shirazi, G. et al., "A Cooperative Retransmission Scheme in Wireless Networks with Imperfect Channel State Information," IEEE Wireless Communications and Networking Conference, Apr. 5-8, 2009, 6 pgs.

Bhagavatula, R. et al. "Adaptive Limited Feedback for Sum-Rate Maximizing Beamforming in Cooperative Multicell Systems," IEEE Transactions on Signal Processing, vol. 59, No. 2, Feb. 2, 2011, pp. 800-811.

Diehm, F. et al., "On the impact of signaling delays on the performance of centralized scheduling for joint detection cooperative cellular systems," IEEE Wireless Communications and Networking Conference (WCNC) 2011, Mar. 28-31, 2011, pp. 1897-1902.

Duel-Hallens, A., "Fading Channel Prediction for Mobile Radio Adaptive Transmission Systems," Proceedings of the IEEE, vol. 95, No. 12, Dec. 2007, pp. 2299-2313.

Papadogiannis, A.; et al.., "A Dynamic Clustering Approach in Wireless Networks with Multi-Cell Cooperative Processing," ICC '08. IEEE International Conference on Communications, May 19-23, 2008, pp. 4033-4037.

Zhou, S. et al., "A Decentralized Framework for Dynamic Downlink Base Station Cooperation," IEEE Global Telecommunications Conference, GLOBECOM 2009, Nov. 30, 2009-Dec. 4, 2009, pp. 1-6.

* cited by examiner

SYSTEM AND METHOD FOR CONTROLLING MULTIPLE WIRELESS ACCESS NODES

This application claims the benefit of U.S. Provisional Application Ser. No. 61/829,469 filed on May 31, 2013, and entitled "Clustering and Rate Allocation for Uplink Coordinated Multi-point Systems with Delayed Channel State Information," which application is hereby incorporated herein by reference.

TECHNICAL FIELD

The present invention relates to a system and method for wireless communications, and, in particular, to a system and method for clustering.

BACKGROUND

There is increasing demand for higher data rates in wireless networks to support sophisticated services such as cloud computing. Wireless systems are adopting more aggressive resource reuse, which leads to increased co-channel interference. In heterogeneous networks (HetNet), the co-channel interference may be especially problematic, because the network deployment may follow an ad hoc style. This may lead to increasing inter-cell interference (ICI) for cell-edge users.

One interference management technique is coordinated multi-point (CoMP) proposed in the third Generation Partnership Project (3GPP) Long-Term Evolution-Advanced (LTE-Advanced). CoMP is also known as network multiple input multiple output (MIMO) or base station (BS) cooperation. CoMP exploits ICI by facilitating channel state information (CSI) and/or user data to be shared and jointly processed by multiple base stations.

In CoMP, clustering determines the pattern of cooperating base stations. Two types of clustering approaches are static clustering and dynamic clustering. In both clustering approaches, the CSI is either shared among network entities or collected by a central controller.

The CSI may be imperfect due to imperfect in channel estimation and the delay in transmitting the CSI. In CoMP, the CSI is propagated over backhaul networks, which are constrained in capacity, leading to lost and delayed CSI. For example, in LTE-Advanced, the standard interface for inter-BS communications, X2, is designed to allow a latency of 20 ms for control plan messages, with an expected typical latency of 10 ms.

SUMMARY

An embodiment method for controlling multiple wireless access nodes includes receiving, by a central controller from a base station (BS), a message indicating a channel state information (CSI) and determining a state transition function in accordance with the message. The method also includes determining a belief state in accordance with the state transition function and determining cooperation for a plurality of BSs including the BS in accordance with the belief state to produce a cooperation decision. Additionally, the method includes transmitting, by the central controller to the BS, the cooperation decision.

Another embodiment method for controlling multiple wireless access nodes includes receiving, by a base station (BS) from a central controller, model information and retrieving, by the BS from a database, a plurality of channel information corresponding to a plurality of user equipment (UE) locations and a plurality of UE speeds. The method also includes determining a state transition function in accordance with the model information and the plurality of channel information and transmitting, by the BS to the central controller, a message including the state transition function.

An embodiment central controller includes a processor and a non-transitory computer readable storage medium storing programming for execution by the processor. The programming includes instructions to receive, from a base station (BS), a message indicating a channel state information (CSI) and determine a state transition function in accordance with the message. The programming also includes instructions to determine a belief state in accordance with the state transition function and determine clustering for a plurality of BSs including the BS in accordance with the belief state to produce a cooperation decision. Additionally, the programming includes instructions to transmit, to the BS, the cooperation decision.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Stochastic control/decision theories may be used to address the impact of imperfect channel state information (CSI). An embodiment determines an optimal clustering and rate allocation problem for coordinated multi-point (CoMP) systems with delayed CSI using a decision theoretic approach. In making clustering and rate allocation decisions, the base stations (BSs) send the local CSI to a central controller. Due to the delay in channel estimation and transmission over backhaul networks, there is a gap between the exact channel state and the observed CSI. The central controller clusters the BSs and allocates user equipment (UE) transmission rates based on this gap. Clustering may be static or dynamic.

A stochastic decision theoretic approach addresses the impact of delayed CSI. Finite state Markov chain (FSMC) is employed to model a fading channel. A belief state with known delay steps is computed based on state transition function and delay. A belief state with unknown delay steps is computed based on a state transition function and observation function following the Bayesian rule. An optimal policy is used to solve the stochastic optimization problem.

In an embodiment, a problem is formulated as a networked Markov decision process (networked-MDP) with delays. In networked-MDP, each subsystem evolves as a Markov decision process. In this example, the subsystem is a BS in CoMP cellular networks. The networked-MDP model with delay is equivalent to a partial observable Markov decision process (POMDP). A low complexity optimal policy for clustering and rate allocation is developed. The wireless channel is modeled as a Markov chain. Uplink and downlink may be used.

Figure 1:
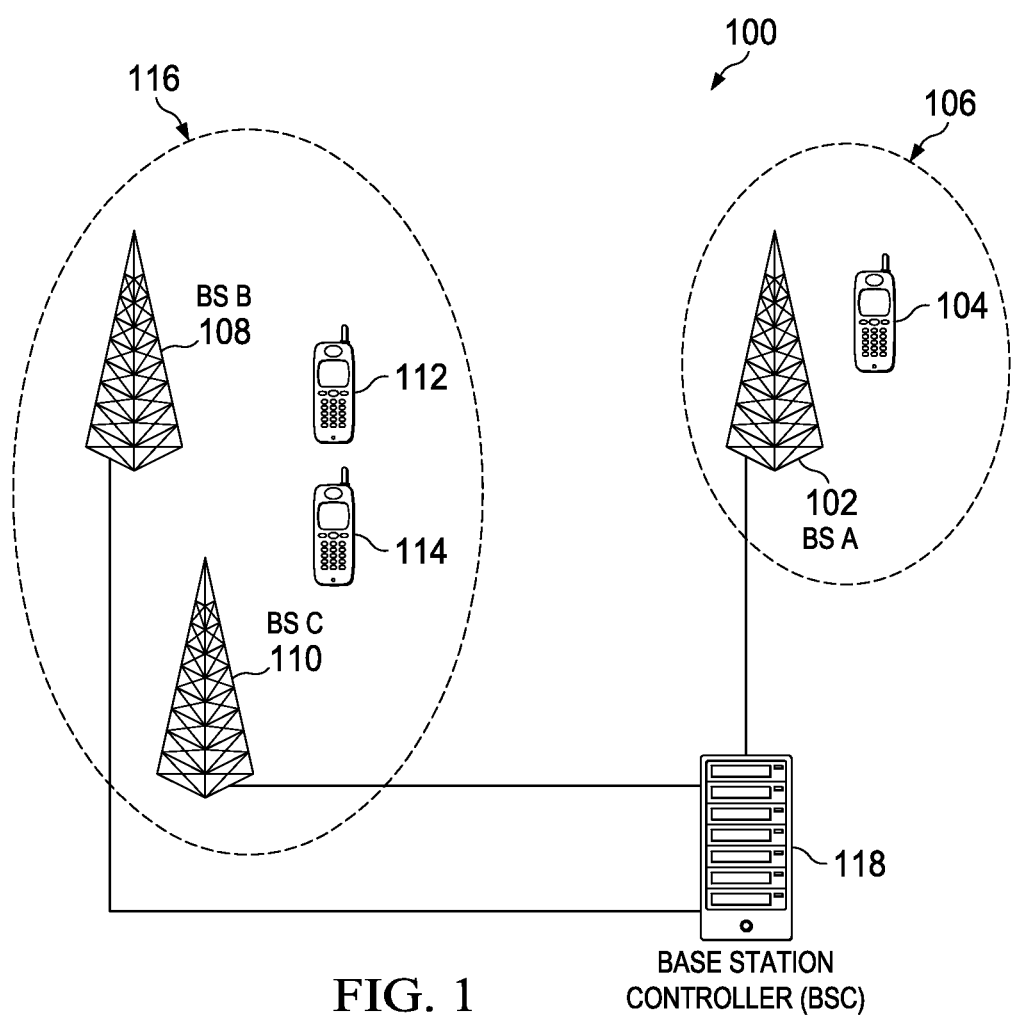
FIG. 1 illustrates a diagram of a multi-cell wireless network for communicating data.

An example network, network 100 for communicating data, is illustrated by FIG. 1. Network 100 is a cooperating hierarchical system architecture. Network 100 has base stations 108 and 110 in cluster 116 and base station 102 in cluster 106.

Base stations 108, 110, and 102 are coupled to central controller 118, which decides how the base stations cooperate. Central controller 118 may be a cloud controller for a cloud random access network (RAN). A cloud controller may perform traffic engineering, scheduling, power control, and assigning pre-coding. Such a controller may be used for a software defined network (SDN).

Base stations 108, 110, and 102 communicate with user equipments (UEs) 112, 114, and 104 respectively. In network 100, there is one UE associated with each BS. In other examples, there are multiple UEs per BS. Base stations 108, 110, and 102 may be any component capable of providing wireless access by, inter alia, establishing uplink and/or downlink connections with UEs 112, 114, and 104, such as a base station (NB), an enhanced base station (eNB), an access point, a picocell, a femtocell, and other wirelessly enabled devices. UEs 112, 114, and 104 may be any component capable of establishing a wireless connection with base station 102, such as cell phones, smart phones, tablets, sensors, etc.

When a cooperating pattern is decided upon, the uplink signals in a cluster are processed by the super base station formed by BSs in a cluster or by central controller 118. The cooperating pattern and rate allocation are determined. The cooperating pattern is inherently an interference management scheme which dictates how the UEs in different clusters interfere with each other. Given a cooperating pattern, the data rate the UEs can transmit is determined.

The set of BSs in the system is denoted as $\beta = \{1, 2, \ldots, B\}$. With CoMP, the cooperating pattern of the BS is dynamically changed. The BSs inside a cooperating set are denoted by $\omega_n$. Assuming the maximum number of coordinating BSs is $N_C$, that is, the cardinality of each $\omega_n \in \Omega$ is no more than $N_C$, a cooperating pattern $\Omega$ is a partition of $\beta$, i.e.:

$$\Omega = \{\omega_n \subseteq \beta : \omega_n \cap \omega_{n'} = \emptyset, \forall n \neq n' \cup_{\omega_n \in \Omega} \omega_n = \beta\}.$$

For example, in FIG. 1, BS 108 and BS 110 form a cluster, while BS 102 itself is another cluster. In an ideal system, better performance is achieved by a larger cooperating set. However, due to the overhead and imperfectness of CSI, large clusters may be problematic.

FSMC models may be used to characterize wireless channels. An FSMC models the temporal variation of the channel gain. In one example, homogenous FSMC of order one is used to model the wireless channel in CoMP cellular networks.

Figure 2:
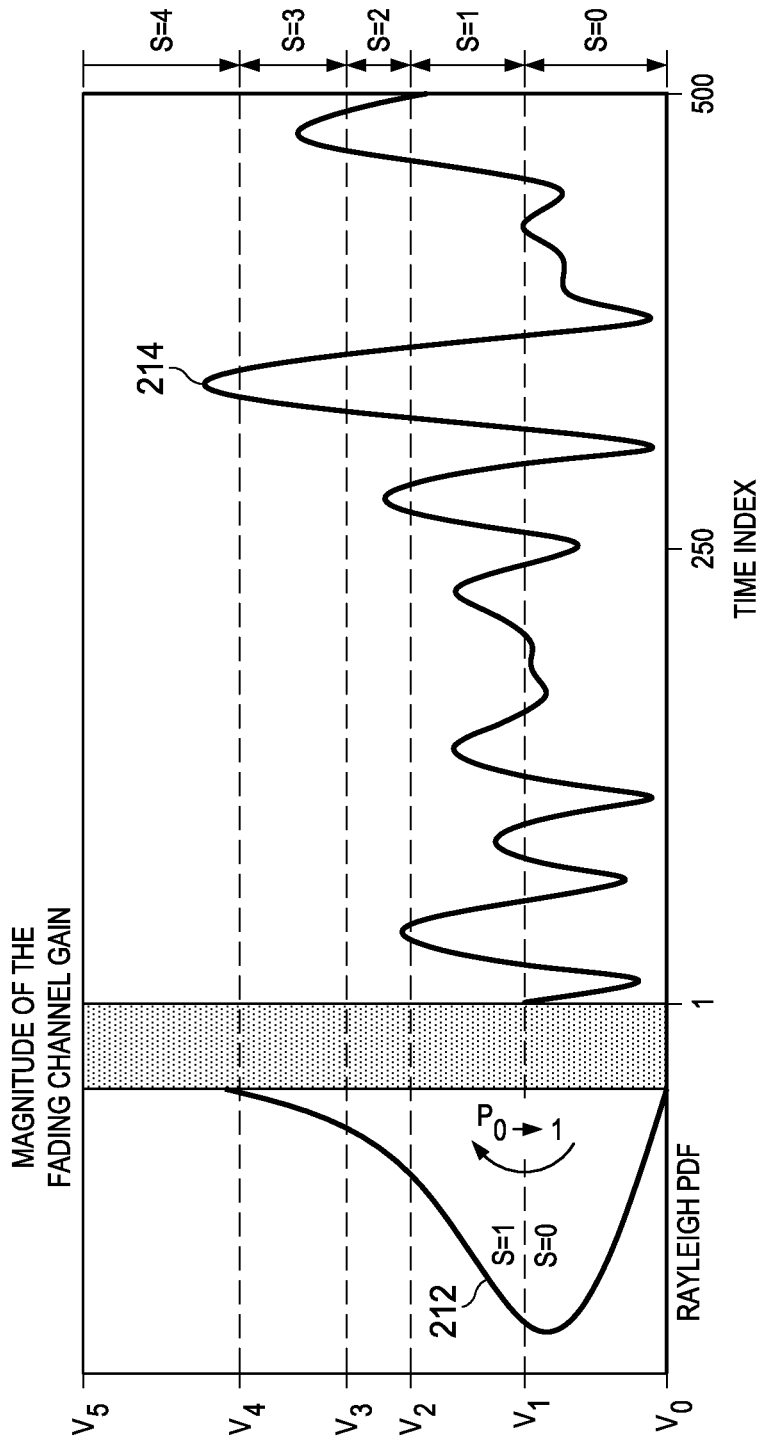
FIG. 2 illustrates a finite state Markov chain (FSMC) model.

For a channel from UE u to BS b, quantization of the continuous channel state into discrete CSI thresholds is denoted as $V_{b,u} = \{V_0, \ldots, V_{M-1}, V_M\}$, in which $0 = V_0 < \ldots < V_{M-1} < V_M = \infty$. Accordingly, the discrete channel states are denoted as $I_{b,u} = \{0, \ldots, M-1\}$. In time slot t, the channel state from a mobile user to BS b is in the same state $m \in I_{B,U}$ if the continuous channel gain $h_{b,u}{}^t$ satisfies $V_{m-1} \leq h_{b,u}{}^t < V_m$. FIG. 2 illustrates a Rayleigh channel which is quantized into an FSMC of five states, where M=5. Curve

212 shows the Rayleigh probability density function (PDF) and curve 214 shows the magnitude of the fading channel gain.

The dynamics of the FSMC is captured by the initial state distribution and the state transition probability matrix. The transition probability between two states $i,j \in I_{b,u}$ is denoted as $Pr(I_{b,u}{}^{t+1}=j|I_{b,u}{}^{t}=i)$. The selection of quantization levels has a significant effect on the transition matrix.

In a cooperating set $\omega$ whose cardinality is $|\omega|=K$, signals for UEs served by BSs in $\omega$ may be decoded without interfering with each other, while the UEs served by the non-cooperating BSs, $\beta-\omega$ are interferes to $\omega$. For the sake of convenience, the BSs in $\omega$ may be numbered from 1 to K, and the BSs in $\delta-\omega$ are numbered from K+1 to B. The complex channel gain from a user equipment served by BS i to the antennas of all the BSs in $\omega$ is denoted as $h_i \in \mathbb{C}^{K \times 1}$, $i=1, \ldots, K, K=1, \ldots B$.

Assuming that each UE is allocated with the same transmission power P, if the complex data symbols of UEs served by cluster $\omega$ are $[x_1 \ldots x_K]$, and the data symbols of UEs served by the other BSs are $[x_{K+i} \ldots x_B]$, the received signal of the antennas of cluster $\omega$ is given by:

$$y = \sqrt{P}\Sigma_{i=1}^{K} h_i x_i + \sqrt{P}\Sigma_{i'=K+1}^{B} h_{i'} x_{i'},$$

where n is a vector of independent complex circularly symmetric adaptive Gaussian noise with each element $n \sim CN(0, N_0)$. The first term is the useful signal inside $\omega$, while the second term is the interference signal from $\beta=\omega$.

With a Minimum Mean Square Error—Successive Interference Cancellation (MMSE-SIC) receiver, the multiple access channel capacity may be achieved. If the decoding order is fixed, the data rates are given as:

$$R_K = \log\left(1 + \frac{P\|h_K\|^2}{N_K}\right),$$

$$R_{K-1} = \log\left(1 + Ph_{K-1}^T(N_{K-1}I_K + Ph_K h_K^*)^{-1} h_{K-1}\right),$$

$$R_2 = \log\left(1 + Ph_2^T\left(N_2 I_K + \sum_{l=3}^{K} Ph_l h_l^*\right)^{-1} h_2\right),$$

and $$R_1 = \log\left(1 + Ph_1^T\left(N_2 I_K + \sum_{l=3}^{K} Ph_l h_l^*\right)^{-1} h_1\right).$$

$N_l$, where $l=1, 2, \ldots, K$, is the additive white Gaussian Noise (AWGN) accounting for the receiver noise $N_0$ and the interference from outside $\omega$. Specifically, the total noise at the $l^{th}$ antenna is:

$$N_l = N_0 + P\Sigma_{l'=K+1}^{B}|h_{l'}|^2.$$

Therefore, given a clustering scheme $\Omega$, the sum rate of the whole system is:

$$R(\Omega) = \Sigma_{\omega \in \Omega} \Sigma_{b \in \omega} R_b(\omega).$$

In one example, the data rates are computed based on MMSE-SIC. However, the framework is applicable to other physical layer techniques, such as beam-forming.

Example analysis of the delay in CSI and its effect is based on modeling the channels as finite state Markov chains. As discussed above, the complex channel gain from the transmit antenna to the receive antenna is characterized as a Markov chain with M states. The quantization and partitioning of the continuous value channel states into discrete ones is an important step in channel modeling. In one example, the Lloyd-Max approach is used, which results in minimum quantization mean square error (MSE).

Figure 3A:
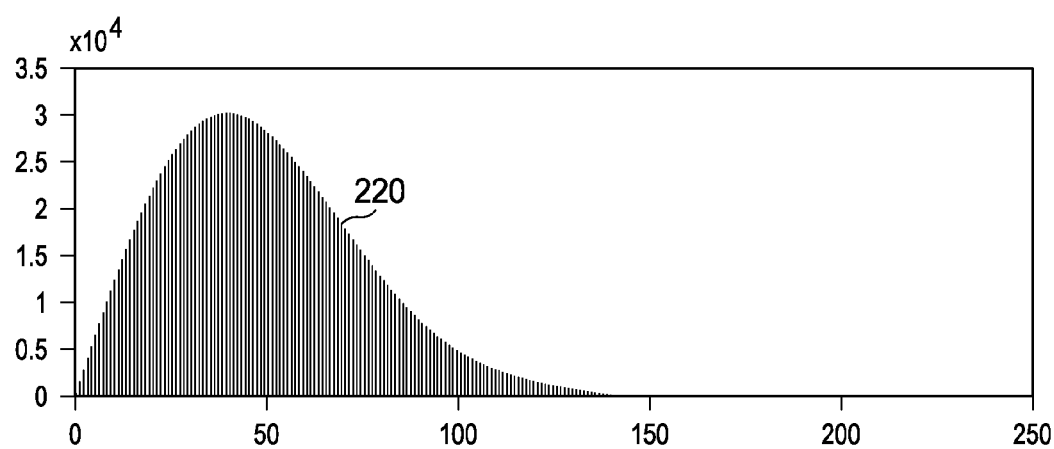
FIGS. 3A-B illustrate a nonlinear partition with an equal stationary distribution.
Figure 3B:
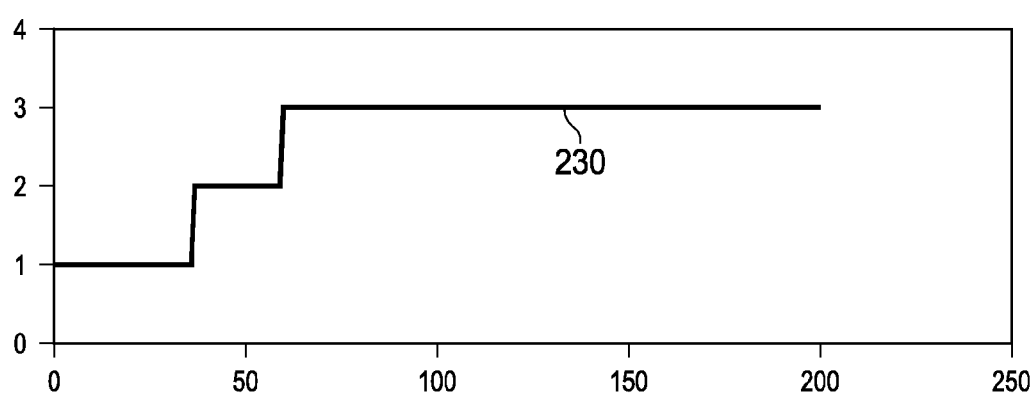

An example quantization scheme is illustrated by FIGS. 3A-B. FIG. 3A shows histogram 220 for a Rayleigh fading channel. FIG. 3B shows how they are mapped into three states with approximately the same stationary probability. Curve 230 shows the partition rule.

In a CoMP system with B base stations and one UE for each cell, the state space of the networked-MDP model is the Cartesian production of $B^2$ FSMCs. Namely, $S=I_{1,1} \times I_{2,1} \times \ldots \times I_{b,u} \times \ldots \times I_{B,B}$, in which $I_{b,u}$ is the FSMC from a transmit antenna of UE u to a receive antenna of BS b, and the size of the state space is $M^{B^2}$. The system state at slot t is denoted as $S^t$, decided by the $B_2$ channels:

$$[I_{1,1}{}^{t+1}, I_{2,1}{}^{t+1}, \ldots, I_{b,u}{}^{t}, \ldots I_{B,B}{}^{t-1}].$$

The state transition function is T. According to the networked MDP model, the probability of the next system state is decided by the current system state and the actions taken by all the subsystems. As a special case of the networked MDP model, the probability of the next system state is decided by the current system state and the actions taken by all the subsystems. In one example of the network-MDP, the system state, namely the channel state, is independent of the actions of BSs. Because in multi-cell systems, the transmit and receive antennas are separated with large distances, we can assume that the propagation of each signal is independent of each other. Provided that the current state is s, the probability for the next system state will be s' is given by:

$$G(s,s') = Pr(S^{t+1}=s|S^t=S) = \Pi_{b=1,u-1}^{b=B,u=B} Pr(I_{b,u}{}^{t+1}|I_{b,u}{}^{t}).$$

Accordingly, the d steps transition probability is given by $T^d$. Conceptually, the size of the matrix T is $M^{B^2}$ by $M^{B^2}$. However, the matrix is a special sparse matrix with non-zero elements lying along the diagonal. The data structure to store such a sparse matrix may be a linked list.

For an observation space O, O=S. In an example, $o \in O$ and $s \in S$ represent a particular realization of the observation and that of the state, respectively.

In a cellular architecture with a central controller, such as network 100, there are links connecting BSs and the central controller, where BSs may signal each other, for example using a backhaul network. Other architectures, such as hierarchical structures, may be used. In an example hierarchical structure, there is a medium level controller, the cluster manager, which is a BS appointed by the central controller, and the signal processing is performed at the cluster manager.

Figure 4:
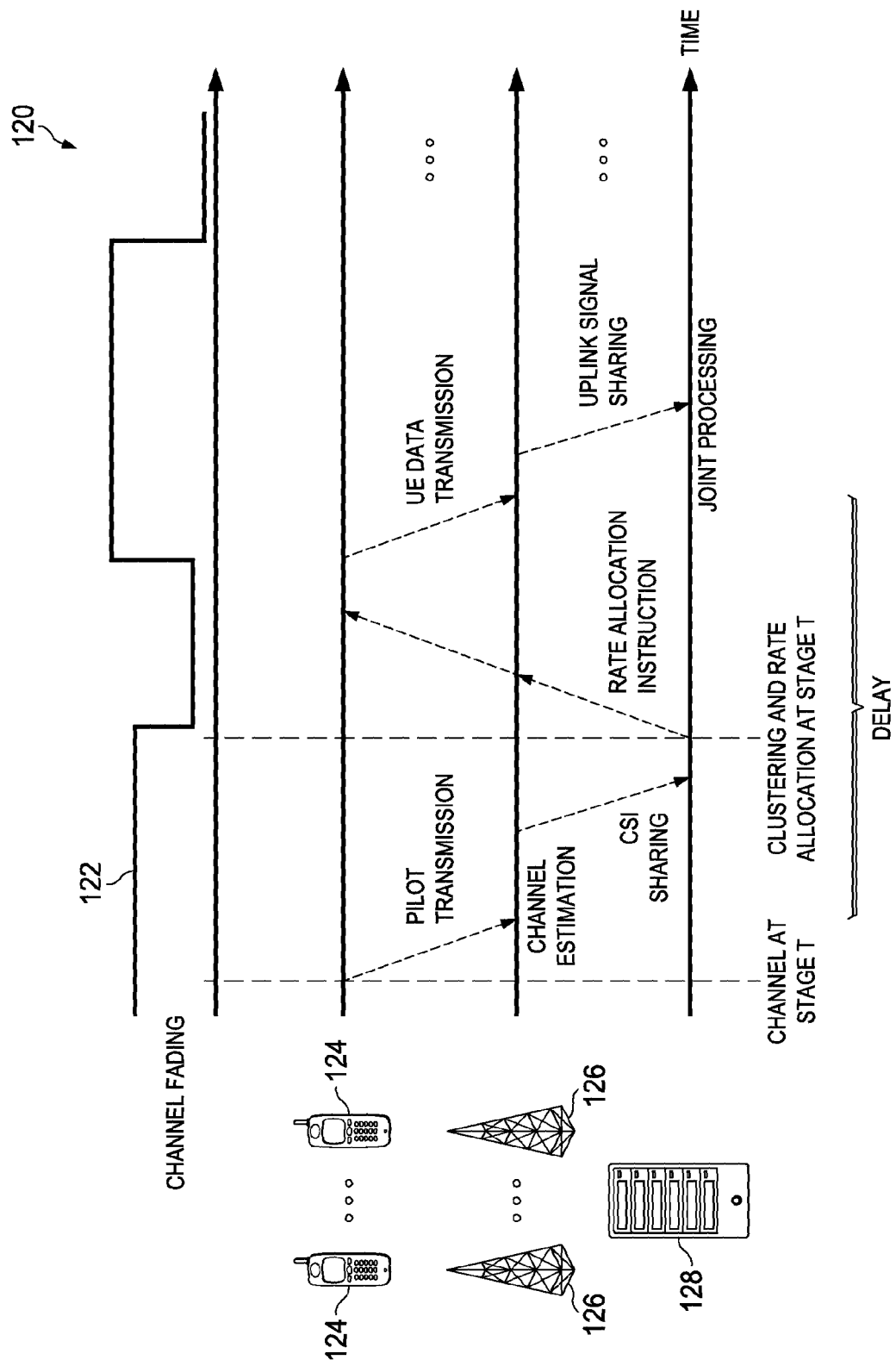
FIG. 4 illustrates a processing procedure in a multi-cell multi-user wireless network.

FIG. 4 illustrates processing procedure 120. Pilot transmission is performed from UEs 124 to BSs 126. The CSI is initially obtained via pilot signals received at BSs 126. After channel estimation, the CSI is transmitted over the backhaul networks to central controller 128. At central controller 128, a decision about how the BSs cooperate and the rates at which UEs transmit are decided after obtaining the CSI. The central controller transmits the rate allocation instructions to the BSs, which forward it to the UEs. Then, the user data is transmitted. The user signals are transmitted from the UEs to the BSs, and propagate along the backhaul to the central controller. Because there is a time delay between determining the CSI and transmitting the data, the channel conditions are different, which leads to an error in the decision. At the time of decision making, the available CSI is outdated. After the decision making, the channel dynamics are occurring in the future from the point of view of decision making. For example, at decision stage t in FIG. 4, the clustering and rate allocation are decided after receiving the CSI representing the channel some time ago. After that, the actual packet transmission may occur in another channel realization. The change in the CSI may be caused by interference, for example in the channel. Interference from other UEs is an important cause of interference, which may be compensated for. Curve 122 demonstrates channel fading. This process demonstrates uplink.

In downlink, the principle is similar. The parameter of delay may be larger than in the uplink case. If the network is a frequency division duplex (FDD) system, the UEs feedback the channel measurements to the BSs, which leads to larger delays before decision making. If the system is a time division duplex (TDD) system, the measurement occurs in the previous uplink data frame, and the delay is larger in channel estimation. The effect of the inaccuracy of the channel state information is more sever in downlink than in uplink.

The outage probability may be derived as a function of delay in CSI in a scheme where the decisions are made only based on current observations. The outage probability determines the throughput, because the throughput is up to the rate allocations and outage probability. This may be derived using one UE, because the system wide throughput is the sum of the throughput of all the UEs.

For a UE, provided that the CSI delay is d, and the current observation is o∈O, its outage probability is given by:

$$Pr(\text{outage}) = \Sigma_{o \in O} Pr(o) \Sigma_{s' \in S: R(o) > C(s')} T^d(o,s'),$$

where Pr(o) is the stationary state distribution, s' and C(s') are the actual channel state and its channel capacity, $T^d$ is the d-step transition matrix, and R(o) is the rate allocation for the UE.

Given a clustering action and rate allocation, the outage probability is decided by the probability measure where the channel capacity is smaller than the rate allocation. The rate allocation for the UE may be a function of the current observation, denoted as R(o). Assuming that the rate allocation is the same as the channel capacity as if the actual channel state is o, the actual channel state is denoted as s', and its corresponding channel capacity is C(s'). Conceptually, the outage probability is the sum of the probabilities of the states, whose channel capacity is smaller than the rate allocation R(o). Namely:

$$Pr(\text{outage}|o) = \Sigma_{s': R(o) > C(s')} Pr(s'|o) = \Sigma_{s': R(o) > C(s')} T^d(o,s').$$

Hence, given the distribution of observation Pr(o), the average outage probability is given by:

$$Pr(\text{outage}) = \Sigma_{o \in O} Pr(o) Pr(\text{outage}|o)$$

$$Pr(\text{outage}) = \Sigma_{o \in O} Pr(o) \Sigma_{s': R(O) > C(s')} T^d(o,s').$$

Thus, the outage probability is dictated by the distribution of the states and the d-step transition matrix.

The outage probability converges as the delay goes to infinity. Assuming that the FSMCs are irreducible, aperiodic, and that all states are ergodic, the stationary distribution $\pi_s = Pr(S=s)$ and the probability transition matrix T have the relationship:

$$\pi(s) = \lim_{d \to \infty} T^d(s,s').$$

Such a stationary distribution may also apply to the observation space. Therefore, as the delay goes to infinity, the outage performance of CoMP based on only an outdated CSI is dictated by the stationary distribution. In particular:

$$\lim_{d \to \infty} Pr(\text{outage}) = \Sigma_{o \in O} \pi(o) \Sigma_{s' \in S: R(o) > C(s')} \pi(s'').$$

Furthermore, the convergence rate of the transition matrix towards stationary distribution is decided by the second largest eigenvalue of the transition matrix.

In one example, the power is allocated to each user is the same, and optimal clustering and rate allocation are determined. In another example, the possible power allocation scheme is also considered.

At time slot t, the central controller selects the cooperating BS and allocates the rate for the UEs. The clustering action at time slot t is denoted by $\Omega^t$, which is a partition of the whole network and the rate allocation as a vector with B elements:

$$R^t = [R_1^t \ldots R_B^t].$$

The overall action is:

$$a^t \triangleq \{\Omega^t, R^t\} \in A,$$

where A is the set of available actions.

At the end of each slot, the data transmissions are either successful or failed due to outage. The multi-cell system will receive an immediate reward. For UE u, where u=1, 2, . . . , B, the instantaneous throughput is denoted as $\zeta^u(S^t, a^t)$, which is a random variable decided by the system state $S^t$ and the action taken $a^t$. The reward function is a sum of the throughput of all UEs:

$$\Sigma_{u=1}^{u=B} \zeta_u(S^t, a^t).$$

The objective of the uplink CoMP is to maximize the average cumulative rate over h slots, i.e., the physical layer throughput. Such objective function is the averaged expected cumulative rewards over h horizons in network-MDP. Namely:

$$\max_{a^t, t=t_0, t_0+1, \ldots, t_0+h-1} \mathbb{E}\left[\frac{1}{h} \sum_{t=t_0}^{t=t_0+h-1} \sum_{u=1}^{u=B} \zeta_u(S^t, a^t)\right].$$

For a particular user, for example UE u, if the current channel capacity is less than the transmission rate allocated there is an outage, such that the resulted transmission rate is 0; otherwise, the resulted transmission rate is equal to the allocated rate. In particular:

$$\zeta_u(S^t, a^t) = \begin{cases} 0, & \text{if } R_u^t > C_u(S^t, a^t), \\ R_u^t, & \text{otherewise,} \end{cases}$$

where $C_u(S^t)$ is the channel capacity for UE u. Provided the action $a^t$, the outage probability of user u is denoted as:

$$Pr_u(\text{outage}|a^t).$$

Hence, the actual successful transmission rate in a time slot t also depends on the outage probability. Namely:

$$\mathbb{E}[\zeta_u(S^t a^t)] = R_u^t \cdot [1 - Pr_u(\text{outage}|a^t)].$$

For a network-MDP, the concept of a solution is a policy defined as a sequence of actions that maximize the rewards or minimize the cost.

To solve the stochastic optimization problem discussed above, a general approach is to use dynamic programming over belief state, which is the sufficient statistic of the previous action and observation history. A belief state $b^t$ at slot t is defined as a probability distribution of the state space. Accordingly, the probability that the state at slot t is $s^t$ is given by the corresponding element in $b^t$ denoted as $b(s^t)$.

Figure 5:
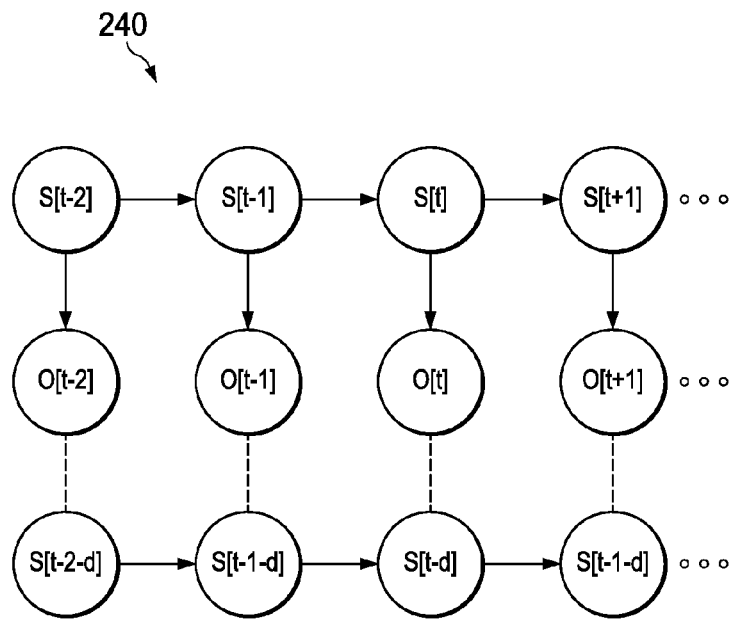
FIG. 5 illustrates a directed graphical model with the relationship between observations and actual states.

Directed graphical model 240 illustrated by FIG. 5 illustrates the relationship between observations and actual states. Each node represents a random variable, the arrow presents a condition probability, and the dashed line represents that the two random variables are equivalent. The first row of the random variables includes the states of the system, which form a first-order Markov chain. The second row is a sequence of observations. The arrow between neighboring states is the state-transition function, while the arrow between a particular state and a corresponding observation is the observation function.

With techniques such as timestamping, the number of delay steps d may be determined. The observation is the actual state delayed by d steps. Namely, for the two random variables $O^t$ and $S^t$:

$$O^t = S^{t-d}, t = d+1.$$

Thus, the belief state is given by:

$$b(s^{t+1}) = Pr(s^{t+1} | o^{t+1}, o^t, \ldots)$$

$$b(s^{t+1}) = Pr(s^{t+1} | s^{t+1-d}, s^{t-d}, \ldots)$$

$$b(s^{t+1}) = Pr(s^{t+1} | s^{t+1-d})$$

$$b(s^{t+1}) = T^d(s^{t+1-d}, s^{t+1})$$

The third equality is given by the first order Markov property assumed in the FSMC channel model, and $T^d$ is the d steps probability transition matrix.

When the number of delay steps is not easily ascertained, the belief state may still be determined. It may be assumed that at slot t, the observation of the system is o∈O, which is decided by the observations over B channels. The observation function O(•) essentially depicts the probabilistic relationship between an observation o∈O and a state s∈S. Formally, observation is also a function of the action taken. However, in this example, the observation is independent of the action taken, and it is defined as:

$$O(s,o) = Pr(o|s).$$

Provided a new observation at time t+1, $o^{t+1}$, the new belief should reflect the likelihood of ending up in new state $s^t+1$, the likelihood of observing $o^{t+1}$, and the previous belief distribution $b^t$. The rule to update the belief state according to the previous belief and the current observation is based on the Bayesian rule defined as:

$$b(s^{t+1}) = Pr(s^{t+1} | o^{t+1}, b^t)$$

$$b(s^{t+1}) = \frac{O(s^{t+1}, o^{t+1}) \sum_{s^t \in S} T(s^t, s^{t+1}) b(s^t)}{\sum_{s^{t+1} \in S} O(s^{t+1}, o^{t+1}) \sum_{s^t \in S} T(s^t, s^{t+1}) b(s^t)}.$$

The second equality is based on the fact that the channel dynamics is independent of the clustering and rate allocation actions.

An example CoMP system is simpler than an example networked-MDP, because there is only a delay between the subsystems (BSs) and the central controller. In general, in networked-MDP, there is also a delay between subsystems. In an example, because the channels between the UEs and the BSs are independent of each other, the system state is Markovian. Therefore, if the system state is perfectly observed, it is a Markov decision process (MDP). However, because the central controller can only see an outdated version of the actual system state, i.e., the system state can only be partially observed, it is a partially observable Markov decision process (POMDP). The complexity of the dynamic programming approach to solve the networked MDP model is PSPACE, which is problematic for large state spaces and horizons. A greedy policy maximizes the expected instantaneous transmission rate, i.e., the action to take at slot t is given by:

$$a^t = \mathrm{argmax}_{a^t \in A} \Sigma_{u=1}^{u=B} R_u^t \cdot (1 - Pr_u(1 - Pr_u(\mathrm{outage}|a^t))).$$

The outage probability is approximated using the Markov chain channel model. Given the rate allocation $R^t$ and the clustering action, the outage probability is approximated by:

$$Pr_u(\mathrm{outage}|a^t) = \Sigma_{C_u(s') < R_u^t} b(s'),$$

which is the probability of the channel being in the states where the allocated transmission rate $R^t$ is greater than the channel capacity C(s'). It may be shown that in uplink CoMP the greedy policy is the optimal policy.

The optimality of the greedy policy is based on the fact that the dynamic of the channel states is independent of the actions taken. At horizon h=1, the optimal action to take is the maximizer of:

$$\mathbb{E}\left[\Sigma_{u=1}^{u=B} \zeta_u(S^1, a^1)\right],$$

which is the action given by the greedy policy to maximize the expected rewards. Assuming at horizon h, h≥1, the optimal policy is the greedy policy. Then, at horizon h+1:

$$\mathbb{E}\left[\sum_{t=0}^{t=h+1} \sum_{u=1}^{u=B} \zeta_u(S^t, a^t)\right] = \mathbb{E}\left[\sum_{t=0}^{t=h} \sum_{u=1}^{u=B} \zeta_u(S^t, a^t)\right] + \mathbb{E}\sum_{u=1}^{u=B} \zeta_u(S^{h+1}, a^{h+1}).$$

Thus, provided the hypothesis that the greedy policy maximizes the first term in the above equation, the action to take to maximize the total expected rewards is the one to maximize the second term, which is equivalent to the case with horizon 1. Therefore, the greedy policy is the optimal policy for the CoMP clustering problem.

Figure 6:
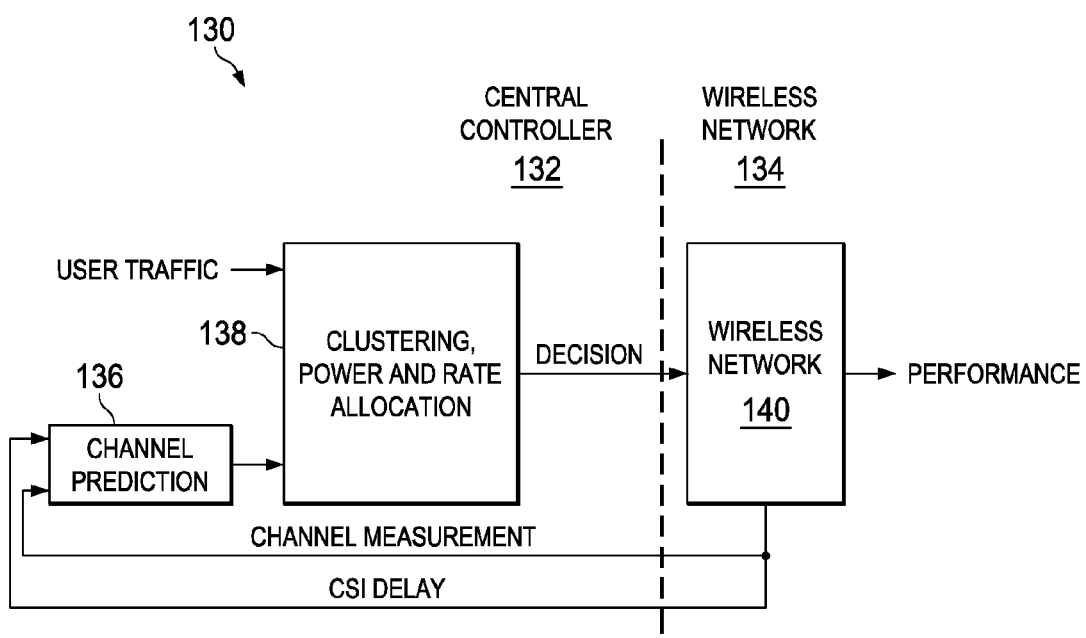
FIG. 6 illustrates a system for determining clustering and data rate allocation with channel state interference (CSI) delay.

FIG. 6 illustrates system 130 for clustering and rate allocation. Central controller 132 contains channel prediction block 136 and clustering, power, and rate allocation block 138, while wireless network 134 contains wireless network 140. In channel prediction block 136, the channel is predicted. The channel is predicted based on a channel measurement from wireless network 140. In one example, the channel is also predicted based on the CSI delay from wireless network 140. Alternatively, the CSI delay is not considered.

A decision is made by clustering, power, and rate allocation block 138 based on the channel prediction from channel prediction block 136 and the user traffic.

The decision is passed on to wireless network 140. Wireless network 140 may output its performance.

Figure 7:
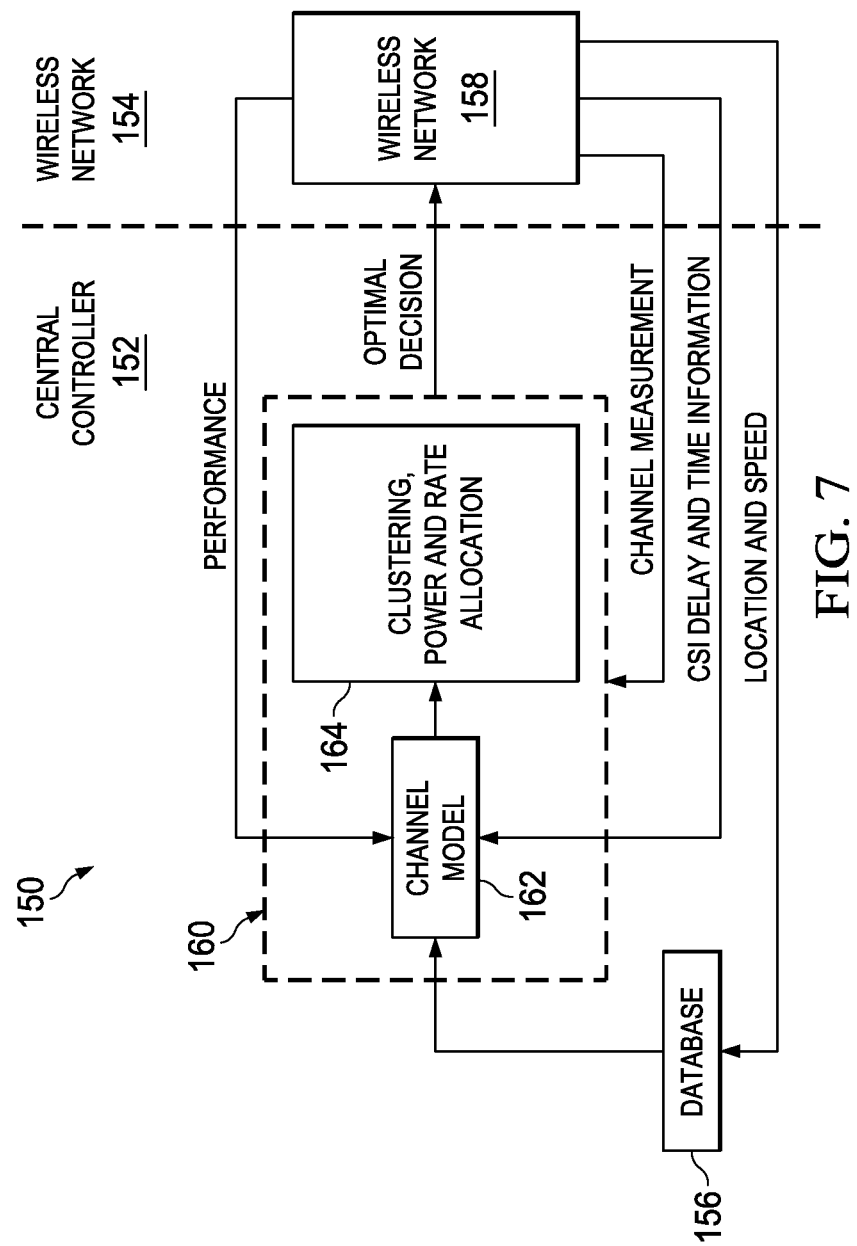
FIG. 7 illustrates an embodiment centralized system for determining clustering and data rate allocation with CSI delay.

FIG. 7 illustrates system 150 for clustering and rate allocation. The delay compensation is centralized in central controller 152, which interacts with wireless network 154. Database 156 stores channel information for historical UE locations and speeds. The data stored includes historical locations and speeds of UEs and information about the channel. This information is received from wireless network 158.

Control block 160 makes a decision based on information from database 156 and from wireless network 158. In control block 160, the channel model models the channel based on the information stored in database 156, the performance from wireless network 158, and CSI delay and time information from wireless network 158. In one example, an FSMC channel model is used. Alternatively, another channel model is used. Channel model 162 may be a finite state machine.

Then, clustering, power, and rate allocation block 164 makes a decision based on the channel model from channel model 162 and a channel measurement from wireless network 158. The channel measurement may be delayed for about 5-10 ms based on the backhaul performance. The power and rate allocation for UE transmission are determined. Also, the clustering for multiple BSs is determined. This may be done for multiple-input multiple-output (MIMO). With fading, the probability that the channel is within X dB of the desired channel is determined.

Wireless network 158 then performs based on the decision from central controller 152. The clustering and rate allocations are applied to the communications system.

Figure 8:
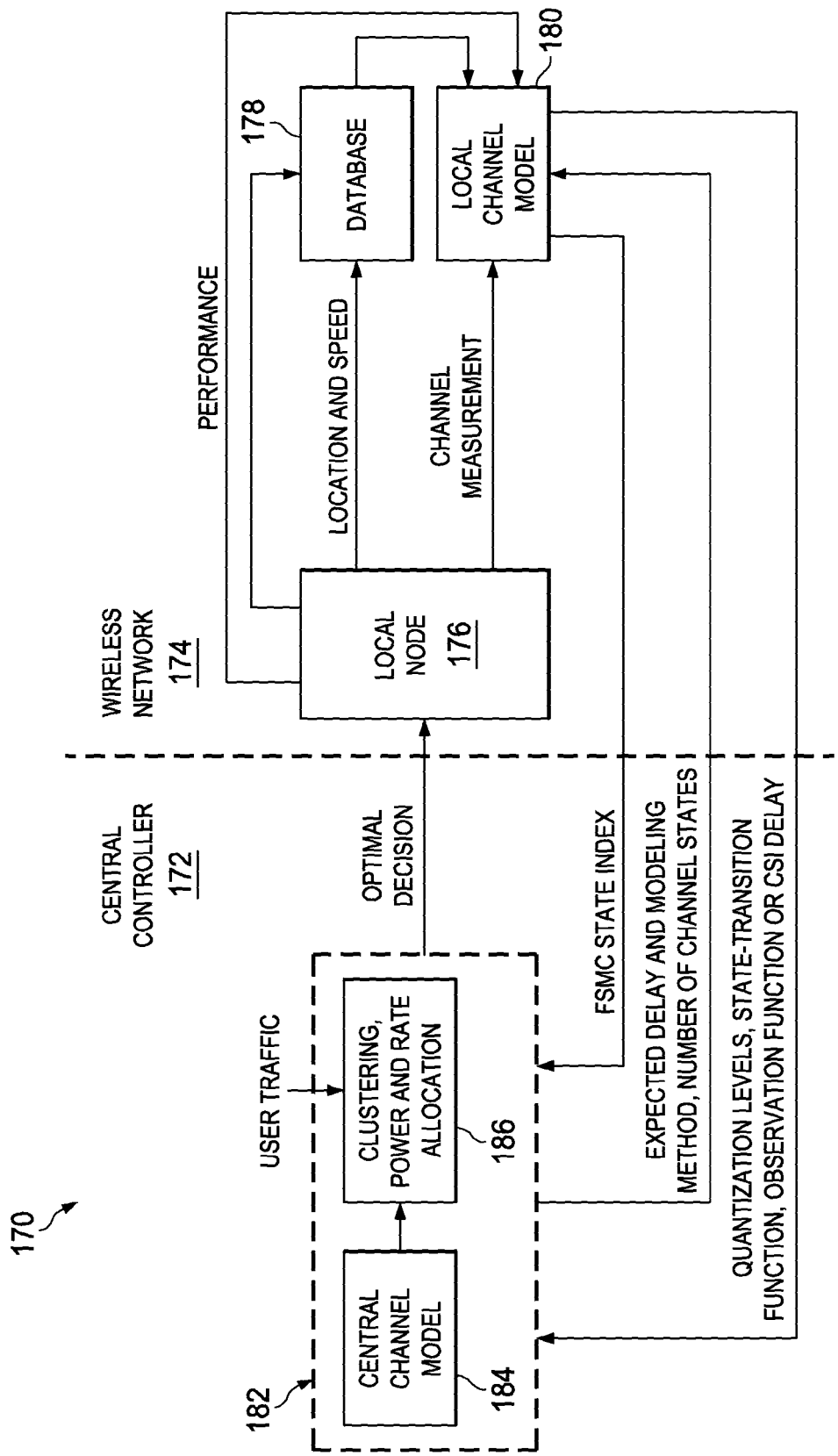
FIG. 8 illustrates an embodiment distributed system for determining clustering and data rate allocation with CSI delay.

FIG. 8 illustrates system 170 for clustering and rate allocation in a distributed system. Some of the computation is performed by central controller 172, and some of the computation is performed by wireless network 174. Central controller 172 contains control block 182. In control block 182, central channel model 184 models the channel based on quantization levels, a state-transition function, and an observation function or CSI delay from local channel model 180 in wireless network 174 and from the FSMC state index from local channel model 180. The FSMC state index is transmitted on a short term message, while the quantization levels, state-transition function, observation function, or CSI delay is transmitted on a long term message. In one example, central channel model 184 is an FSMC channel model. Central channel model 184 determines the expected delay and modeling method, along with the number of channel states, which are output to local channel model 180 in wireless network 174.

Clustering, power, and rate allocation block 186 makes a decision based on the channel model from central channel model 184 and user traffic.

The decision is output to local node 176 in wireless network 174. Local node 176 may be a base station. Local node 176 determines the channel measurement, performance, and location and speed of the UE. The location and speed are stored in database 178. Database 178 stores the channel information location and speed. The performance and channel measurement are passed to local channel model 180. Local channel model 180 may be an FSMC model.

Figure 9:
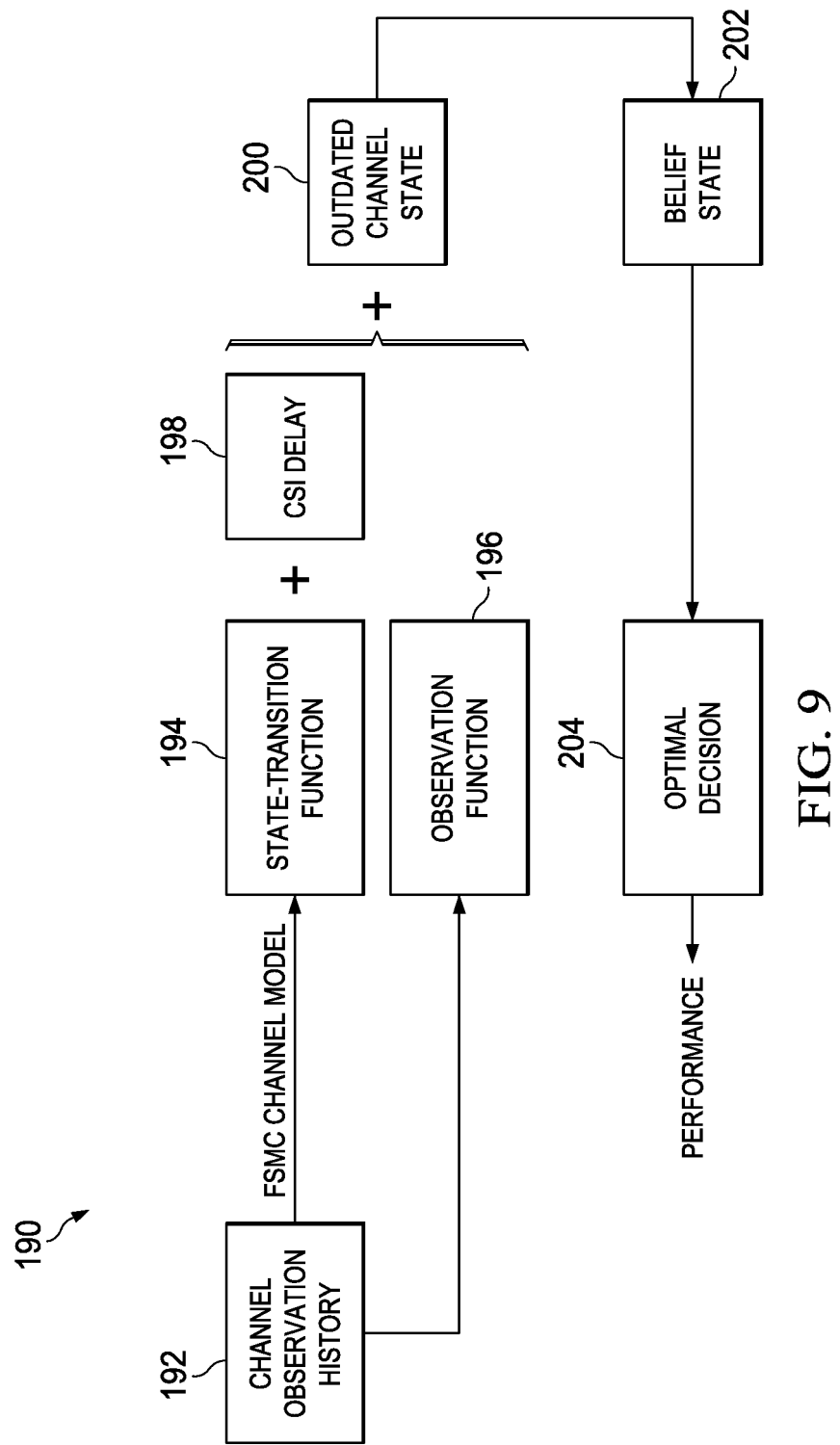
FIG. 9 illustrates a flowchart for an embodiment method of performing clustering and data rate allocation with CSI delay.

FIG. 9 illustrates system 190 for estimating the CSI accounting for the CSI delay. The channel observation history is stored in channel observation history block 192. The channel is modeled, for example by an FSMC model. The FSMC model includes state-transition function 194 and observation function 196.

Observation function 196 is the observation function in the FSMC.

CSI delay 198 is the CSI delay.

Outdated channel state 200 contains the known CSI. The channel has changed since the CSI information was determined.

State-transition function 194 is the probability of two states in the Markov chain. State transition function 194, observation function 196, CSI delay 198, and outdated channel state 200 are used to determine belief state 202. Belief state 202 is the probability mass function (PMF) of the actual channel state.

The optimal decision 204 is made based on belief state 202. The optimal decision is the decision that maximizes the mean sum throughput.

Figure 10:
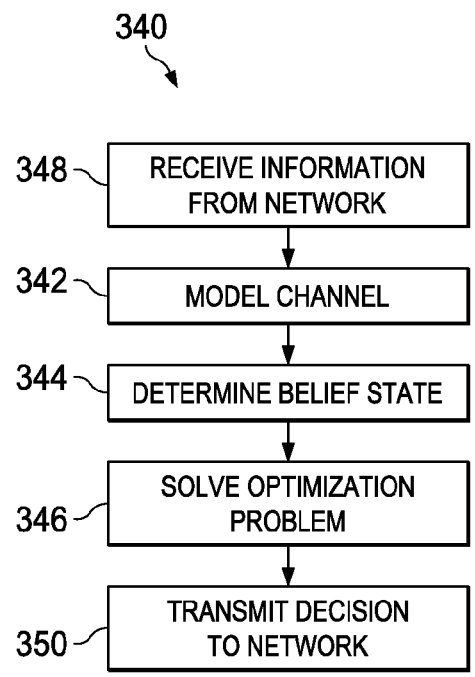
FIG. 10 illustrates a flowchart for an embodiment method of performing clustering and data rate allocation performed by a central controller.

FIG. 10 illustrates flowchart 340 for a method of determining clustering and rate allocation performed by a controller. Initially, in step 348, the controller receives information from base stations in the network. When a centralized method is used, locations and speeds of UEs in the network the CSI delay and time information is used. Also, the channel measurement is received, which may be delayed by 5-10 ms. When a centralized method is used, the performance of the network is also received by the controller. In the centralized method, the location and speed information is stored in a database containing channel information, locations, and speed. When a distributed method is used, a short term message and a long term message may be received. The short term message includes the FSMC state index, while the long term message includes quantization levels, a state-transition function, and an observation function or CSI delay.

In step 342, the channel is modeled, for example using FSMC. Channel information such as historical UE locations and speeds, is read from a database in the centralized method. A Markov chain is a mathematical system that undergoes transitions from one state to another on a state space. It is a random process usually characterized as memory less. The state-transition function, which is the probability of two states in the Markov chain, is determined. Also, the observation function is determined. If the uplink CoMP system has B base stations and one UE per cell, the state space of the FSMC for the channel from a transmit antenna of UE $u_j$ to a receive antenna of BS $b_j$ is $S_{bi,uj}$ where $i, j=1, 2, \ldots, B$. The state space of the whole networked-MDP system is the Cartesian product of all the $B^2$ FSMCs:

$$S = S_{b_1 u_1} \times S_{b_2 u_1} \times \ldots \times S_{b_B u_B}.$$

The size of the state space is $M^{B^2}$, where M is the number of states for the FSMC. The state-transition function T is given by the FSMC channel model:

$$T(s[t], s[t+1]) = Pr(S[[t+1]=s[t+1]|S[t]=s[t]])$$

$$(s[t], s[t+1]) = \Pi_{i=1, j=1}^{i=B, j=B} Pr(h_{b_j, u_j}[t+1] | h_{b_j, u_j}[t]).$$

Stochastic optimization is performed. At slot t, the central controller selects the cooperating BSs and allocates the rate for UEs. The clustering action at time $t_i$ is denoted by $\Omega[t]$, a partition of the whole network. The rate allocations as a vector with B elements is denoted by:

$$R[t] = [R_1[t] \ldots R_B[t]].$$

The overall action is:

$$a[t] = \{\Omega[t], R[t]\} \in A,$$

where A is the set of actions available. At the end of each slot, the data transmissions are either successful or unsuccessful due to outage. In the network-MDP terminology, the multi-cell system will receive an immediate reward. For UE u, u=1, 2, ..., B, the instant throughput is denoted by:

$$\zeta_u(S[t], a[t]),$$

a random variable decided by the system state S[t] and the action a[t]. The reward function is a sum of the throughput of all UEs:

$$\Sigma_{u=1}^{u=B} \zeta_u(S[t], a[t]).$$

The objective of the uplink CoMP is to maximize the average cumulative rate over h slots, i.e., the physical layer throughput. The objective function is the averaged expected cumulative rewards over h horizons in network-MDP. Namely:

$$\max_{a[t],t=1,2,\ldots,h} \mathbb{E}\left[\frac{1}{h}\sum_{t=1}^{t=h}\sum_{u=1}^{u=B} \varsigma_u(S[t], a[t])\right].$$

In one example, the channel is entirely modeled by the central controller. In another example, the channel is partially modeled by the central controller and partially modeled by the BSs.

Next, in step 344, the belief state is determined based on the state transition function and observation generated by the FSMC, the CSI delay, and the outdated CSI. This is the PMF of the actual channel state. The belief state is the sufficient statistic of the previous action and the observation history. With techniques such as timestamping, the number of delay steps d may be determined. With an assumption on the number of delay steps, the observation is the actual state delayed by d steps, namely:

$$O[t]=S[t-d], t=d+1.$$

Thus, the explicit relation between the current state and the observation is:

$$b(s[t+1])=Pr(s[t+1]|o[t+1],o[t],\ldots)$$

$$b(s[t+1])=Pr(s[t+1]|s[t+1-d],s[t-d],\ldots)$$

$$b(s[t+1])=Pr(s[t+1]|s[t+1-d])$$

$$b(s[t+1])=T^d(s[t+1-d],s[t+1])$$

At slot t, the observation of the system O[t] is o[t], which is decided by observations over B channels. Observation function O depicts imperfect channel estimation:

$$O(s[t],o[t],a[t])=P(O[t]=o[t]|S[t]=s[t]).$$

Provided a new observation at time t+1, o[t+1], the new belief reflects the likelihood of ending up in new state s[t+1], the likelihood of observing s[t+1], and the previous belief distribution b[t]. That is:

$$b(s[t+1]) = Pr(s[t+1]|o[t+1], a[t], b[t]) =$$

$$\frac{O(s[t+1], a[t], o[t+1])\sum_{s[t]\in S} T(s[t], a[t], s[t+1])b(s[t])}{\sum_{s[t+1]\in S} O(s[t+1], a[t], o[t+1]) \sum_{s[t]\in S} T(s[t], a[t], s[t+1])b(s[t])} =$$

$$\frac{O(s[t+1]|o[t+1])\sum_{s[t]\in S} T(s[t], a[t], s[t+1])b(s[t])}{\sum_{s[t+1]\in S} O(s[t+1], o[t+1]) \sum_{s[t]\in S} T(s[t], s[t+1])b(s[t])}.$$

Then, in step 346, the decision is determined based on the belief state. This is done to maximize the mean sum throughput. The greedy policy maximizes the expected instantaneous transmission rate. The action to take at slot t is given by:

$$a^*[t]=\text{argmax}_{a[t]\in A}\Sigma_{u=}^{u=B}R_u[t]\cdot(1-P_{out,u}(S[t],a[t])).$$

The outage probability is approximating using the Markov chain model. Given the rate allocation R[t] and a guess of the actual channel state $\hat{S}[t]$, the outage probability is approximated by:

$$P_{out,u}(a[t])=\Sigma_{C_u\hat{S}[t]<R_u[t]}b(\hat{S}[t]).$$

which is the probability of the channel being in the states where the allocated transmission rate R[t] is greater than the channel capacity $C(\hat{S}[t])$.

In step 350, the decision is transmitted to the BSs. When a distributed method is used, the expected delay and modeling method and the number of channel states are also transmitted to the BSs.

Figure 11:
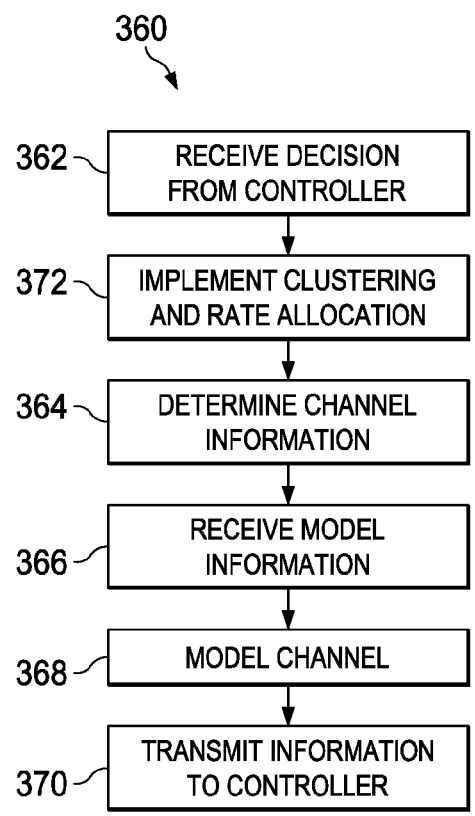
FIG. 11 illustrates a flowchart for an embodiment method of performing clustering and data rate allocation performed by a base station (BS)

FIG. 11 illustrates flowchart 360 for a method of determining clustering and rate allocation performed by a base station. Initially, in step 362, the BS receives a decision from the controller. The decision includes clustering and rate allocation.

Next, in step 372, the BS implements the clustering and rate allocation received in step 362. The BS cooperates with other BSs assigned to its cluster. Also, the BS sets the data rates for its associated UEs.

Then, in step 364, the BS determines the CSI. The CSI is estimated and quantized. The CSI delay and time information is ascertained. Also, the BS determines the location and speed of associated UEs. This may be done by requesting the locations and speed from the UEs, and receiving the information in responses from the UEs. Also, the BS monitors the performance.

Steps 366 and 368 are performed in a distributed method. In step 366, the BS receives model information from the controller. The received model information may include the expected delay and modeling method and the number of channel states.

In step 368, the BS models the channel. The channel information location and speed information of UEs is stored in a database at the BS. The historical location and speed information is retrieved from the database. The channel is modeled based on the information retrieved from the database, the measured channel from step 364, location and speed information of the UEs, the performance, and the expected delay and modelling method and the number of channel states received from the central controller. The BS generates a state-transition function and an observation function or CSI delay. The BS also produces quantization levels and an FSMC state index. For this, the BS may send the anticipated changes for the future for the central controller to take into account for its own decision.

Finally, in step 370, the BS transmits information to the central controller. When a centralized method is used, the location and speed of UEs, the channel measurement, the CSI delay and time information, and performance information are transmitted to the central controller. On the other hand, when a distributed method is used, an FSMC state index, quantization levels, state-transition function, and observation function or CSI delay is transmitted to the central controller.

Computer simulations are carried out to evaluate the performance of an example clustering and rate allocation scheme. For the time-varying wireless channels, the $3^{rd}$ generation partnership project spatial channel model extended (3 GPP-SCME) channel model is used. There are three base stations in the system, with one antenna per BS, and the inter-site distance is 800 m. The number of clusters is set to two, so the number of possible clustering action is three. Three other schemes are used for comparison.

In one example, clustering is based on the current observation. Specifically, the central controller selects the best cooperating set and allocates the rates according to the current CSI observation. An error margin δ is used for rate allocation. In particular, given the knowledge of the channel signal to interference plus noise ratio (SINR), a transmission rate is decided based on the threshold SINR. A lower rate is used unless the SINR is greater than the threshold by δ. The usage of error margin increases the reliability of data transmissions. In the simulations, the error margins range from 0 to 9.5 dB.

In another example, a universal reuse cellular network without cooperation is used, in which the interference from neighboring cells are taken as noise.

An additional example is based on channel prediction using auto-regressive (AR) model based techniques. It predicts the current channel state information based on the history of outdated CSI. Then, a clustering and rate allocation decision is made based on the new channel prediction. The order and the size of the window in prediction are two and five, respectively.

The parameters used in the simulations are given in Table 1, below. The fast fading dynamics is characterized by a normalized Doppler shift, which is defined as the Doppler frequency shift times the sample duration. Because the Doppler frequency shift is approximately the inverse of the coherence time, the normalized Doppler shift is the ratio of coherence time over the sample duration. The delay is measured in the number of state transition steps. For each state transition step, the physical time duration is 1 ms. The channel state value in each state is obtained via averaging the values the channel state samples.

TABLE 1

| Parameter | Value |
| --- | --- |
| Carrier frequency | 2110 MHz |
| Base station antenna height | 24 m |
| User equipment antenna height | 0.5 m |
| Sampling duration | 1/500,000 |
| Normalized Doppler shift | From 0.01 to 0.06 |
| Path loss | 30.18 + 26 * log 10 (distance) |
| Signal bandwidth | 15 KHz |
| Receiver noise power density | −174 dBm/Hz |
| User equipment transmit power | 20 dBm |

Figure 12:
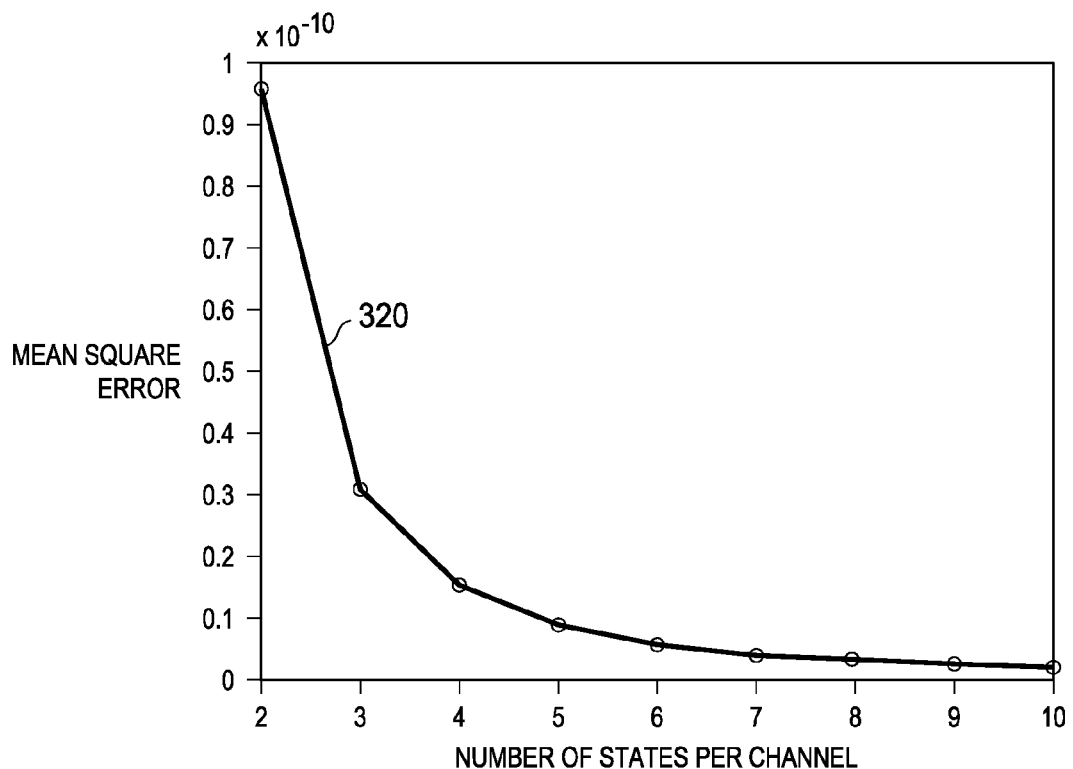
FIG. 12 illustrates a graph of mean square error versus the number of states per channel in quantization with the Lloyd-Max algorithm.

In the simulations, the stationary state distribution and state transition probability matrix from $2 \times 10^6$ channel realization of fading channels are abstracted. In quantizing the channel state information, the Lloyd-Max algorithm is used, which minimizes the mean square error (MS). An important parameter in quantization is the number of states per channel. FIG. 12 depicts curve 320 illustrated the mean square error versus the number of states per channel in quantization with the Lloyd-Max algorithm. The MSE decreases exponentially with an increase in the number of states. For the simulations, the continuous channel values are quantized into two states.

Figure 13:
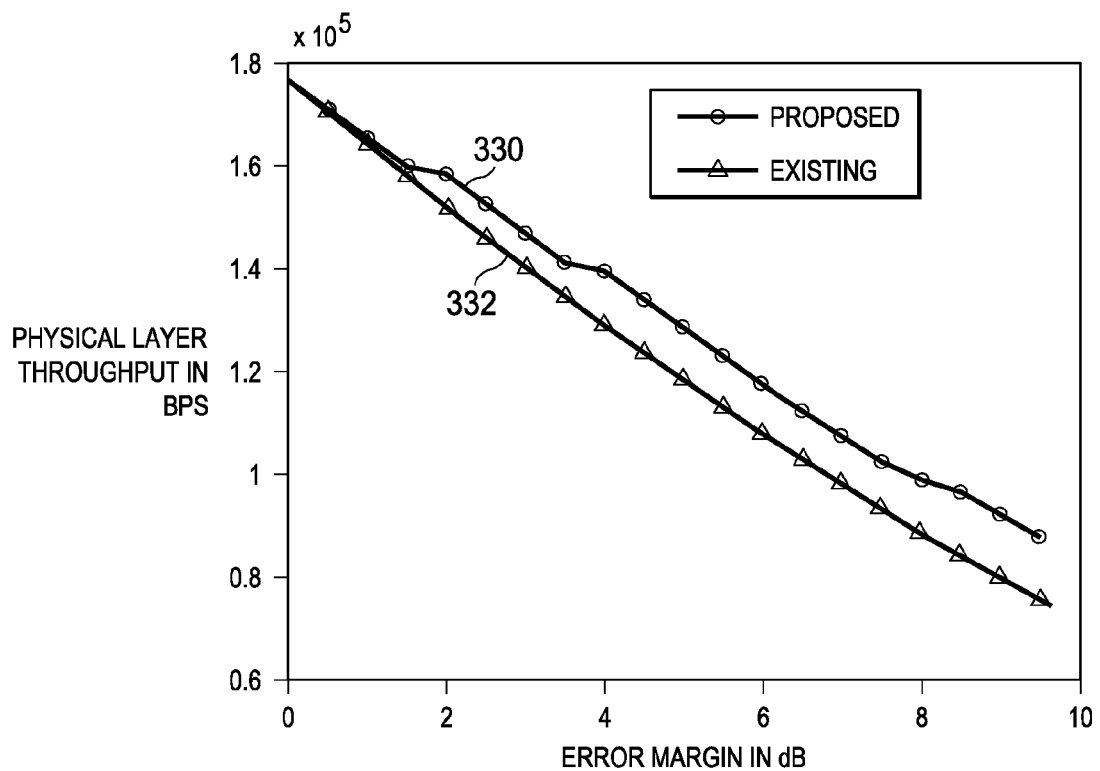
FIG. 13 illustrates a graph of physical layer throughput versus error margin when there is no delay.
Figures 14, 15:
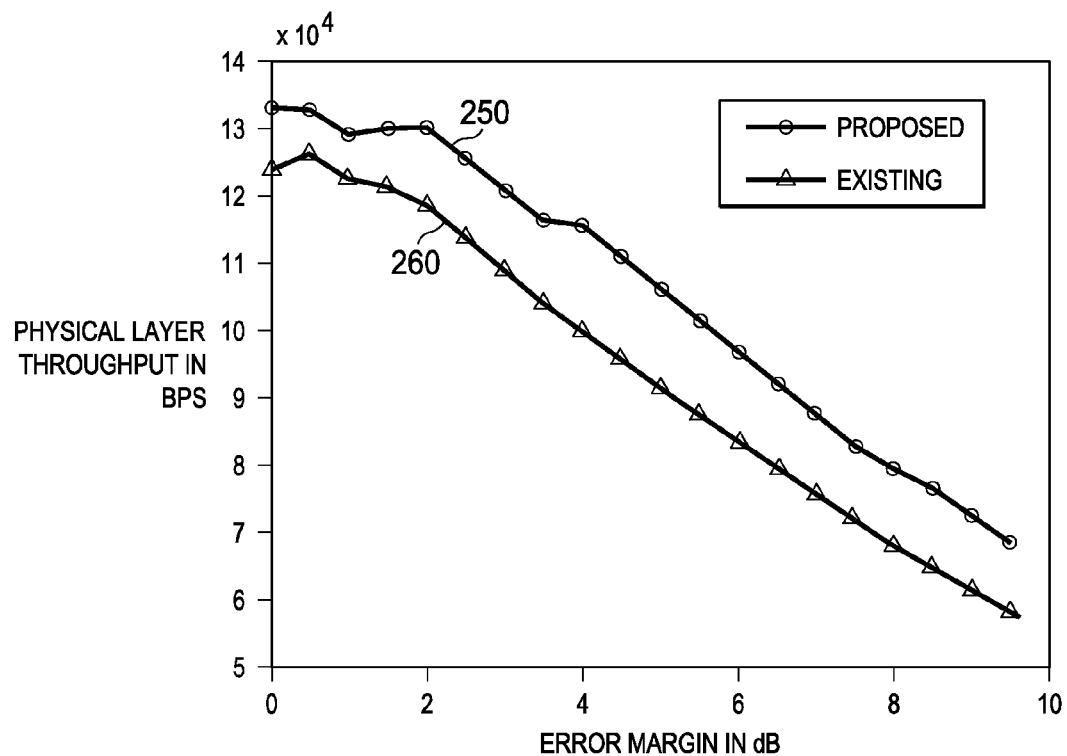
FIG. 14 illustrates a graph of physical layer throughput versus error margins when there is a delay of three steps.
FIG. 15 illustrates a graph of physical layer throughput versus delay steps with a normalized Doppler shift of 0.01.

The setting of the error margin is important for some cooperative schemes. For example, FIG. 13 illustrates the effects of error margins when there is no delay. Curve 330 shows the physical layer throughput in bits per second (bps) versus error margin in dB in a proposed scheme, while curve 332 shows the physical layer throughput in bps versus error margin in dB in another scheme. Both schemes deteriorate by using error margin in rate allocation when there is no delay. The normalized Doppler shift is 0.06. With a larger error margin, higher data rates are achieved for the proposed scheme, because a higher data rate and clustering pattern may be used even when the set of rates is constrained by the error margin. FIG. 14 illustrates a graph of the effects of error margins for the case where the delay is three steps. Curve 250 shows the physical layer throughput in bps for a proposed scheme and curve 260 shows the physical layer throughput in bps for an existing scheme. When the error margin is small, for example less than 0.5 dB, the error margin helps the existing scheme, where the best performance is reached when the error margin is 0.5 dB. However, error margins do not help the proposed scheme.

To study the effects of delay, simulations of various normalized Doppler shifts is performed. Small normalized Doppler shifts correspond to large coherence time and the low mobility scenario. The non-cooperative scheme serves as a baseline. For the non-cooperative scheme, the delay only comes from the channel estimation. On the other hand, for the cooperative schemes, if there is delay, the delay includes the one step channel estimation delay plus the backhaul delay.

FIG. 15 compares the throughput between various schemes. Curve 260 shows the physical layer throughput for the proposed scheme, curve 262 shows the physical layer throughput for a prediction scheme, curve 264 shows the physical layer throughput for a cooperation scheme, and curve 266 shows the physical layer throughput for a non-cooperation scheme. The physical layer throughput of the three cooperative schemes drops gradually as delay increases. The difference between the cooperative schemes is minor. With low UE mobility, the effect of delay in CSI is not significant. Moreover, none of the schemes are effective at reducing the effect.

Figure 16:
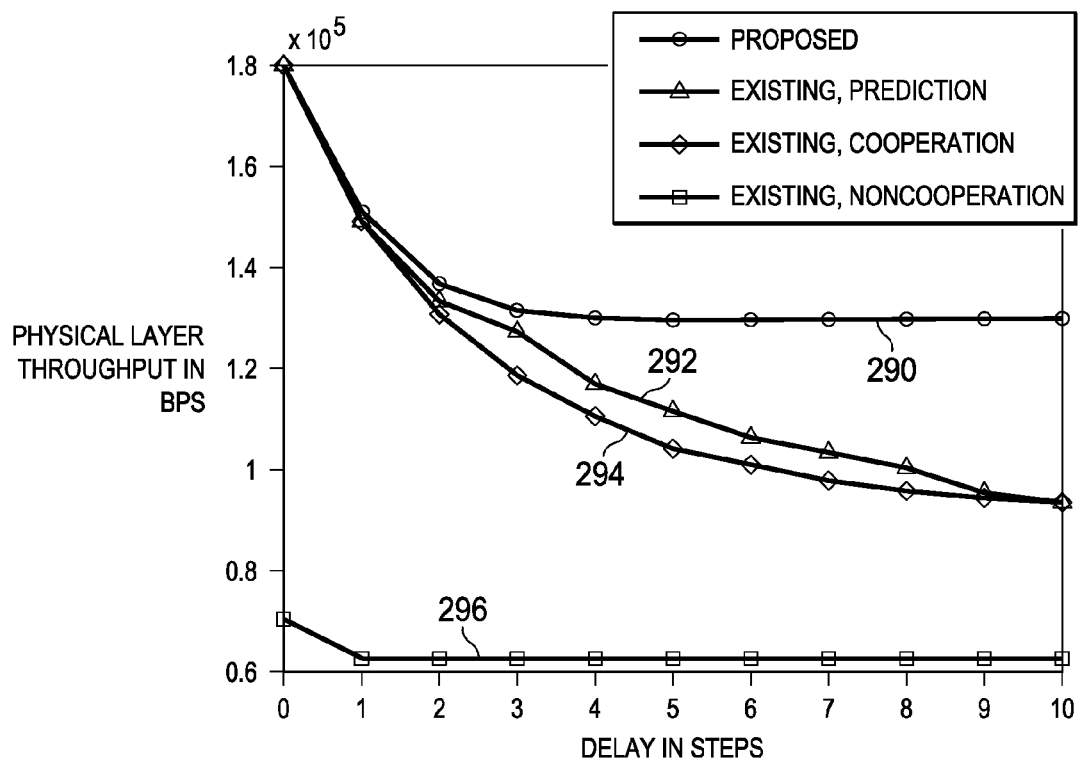
FIG. 16 illustrates a graph of physical layer throughput versus delay steps with a normalized Doppler shift of 0.06.

With a higher UE velocity, namely a large Doppler shift, a higher performance gain may be expected for the proposed scheme. The effect of delay on throughput with a normalized Doppler shift of 0.06 is illustrated in FIG. 16. Curve 290 shows the physical layer throughput for the proposed scheme, curve 292 shows the physical layer throughput for the prediction scheme, curve 294 shows the physical layer throughput for the cooperation scheme, and curve 296 shows the physical layer throughput for the non-cooperation scheme. When the delay is smaller than eight steps, the AR prediction scheme has some advantages over the existing non-predictive scheme. However, the performance of AR prediction decreases dramatically as delay increases. The advantage of the existing non-predictive scheme diminishes when the delay is larger than nine steps. In contrast, for the proposed scheme, considerably higher throughput is observed when the delay is large. In particular, an embodiment scheme outperforms the existing cooperative scheme by more than 30% when the delay is more than six steps. This is largely due to the fact that with a large delay, the proposed scheme is able to utilize the stationary distribution of the finite state Markov chains to make good decisions.

Another important factor impacting the channel dynamics is the speed of the UEs, which is related to the Doppler shift. The effect is investigated by ranging the normalized Doppler shift from 0.01 to 0.06 for various delay settings.

Figure 17:
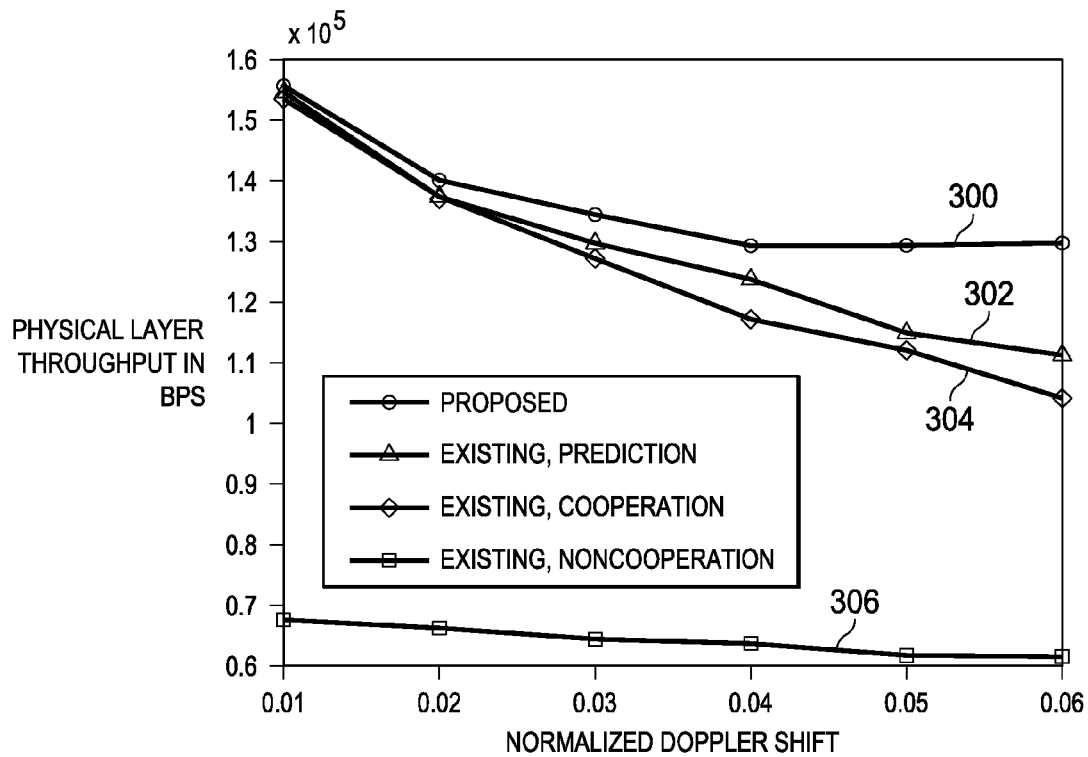
FIG. 17 illustrates a graph of physical layer throughput versus normalized Doppler shift with a delay of five steps.

FIG. 17 illustrates the effects of UE mobility speed on throughput when the delay is five steps, a moderate delay. The embodiment scheme outperforms the existing schemes. Curve 300 shows the physical layer throughput for an embodiment scheme, curve 302 shows the physical layer throughput for the prediction scheme, curve 304 shows the physical layer throughput for the cooperation scheme, and curve 306 shows the physical layer throughput for the non-cooperation scheme. The existing AR prediction scheme has only minor gains over the existing cooperative scheme in low mobility cases. The embodiment scheme obtains more throughput than the AR-prediction scheme by around 2% in the low mobility case and by 18% in the high mobility case.

Figure 18:
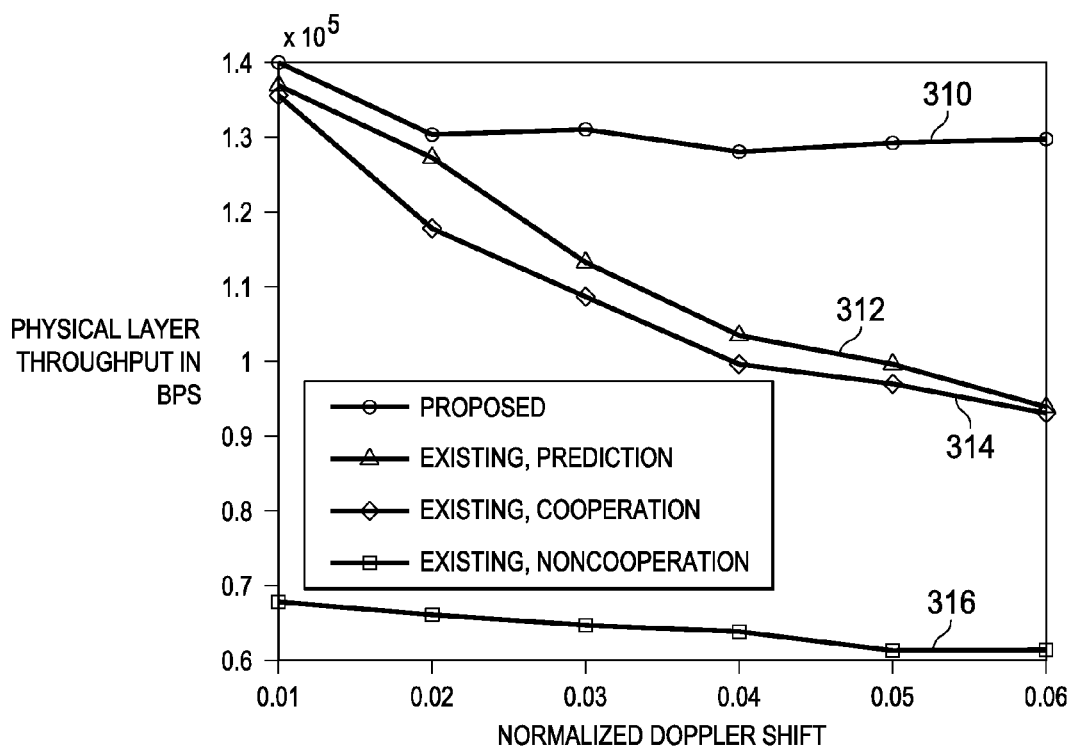
FIG. 18 illustrates a graph of physical layer throughput versus normalized Doppler shift with a delay of ten steps.

FIG. 18 illustrates the effects of UE mobility speed on throughput when the delay is 10 steps, a large delay. Curve 310 shows the physical layer throughput for an embodiment scheme, curve 312 shows the physical layer throughput for the prediction scheme, curve 314 shows the physical layer throughput for the cooperation scheme, and curve 316 shows the physical layer throughput for a non-cooperation scheme. The AR-prediction scheme deteriorates and loses the prediction capability when the mobility is high. In contrast, an embodiment scheme has significant performance gains. Such gains increase as the UE mobility increases. Specifically, an embodiment scheme achieves about a 45% higher data rate than other schemes at a high mobility.

When the fading process is jointly Gaussian, the autoregressive based channel prediction is the optimal channel predictor in terms of mean square error. However, its performance declines significantly in high mobility scenarios when the delay is large. By contrast, and embodiment decision theoretic scheme is not simply predicting the channel state but making the best decision under uncertainty. With a large delay and high channel dynamics, the embodiment scheme outperforms the AR-prediction scheme.

Furthermore, an embodiment scheme has a computational complexity advantage. Table 2 illustrates the average computation tome for an AR-prediction scheme and an embodiment scheme. The embodiment scheme may react quickly because the online table lookup time is negligible. By contrast, the computational complexity of AR-prediction is problematic for real-time operations.

TABLE 2

| Scheme | Offline phase | Online phase |
| --- | --- | --- |
| AR-Prediction | 0 | 275 ms per slot |
| Embodiment | 8.3 s | Negligible table lookup |

Figure 19:
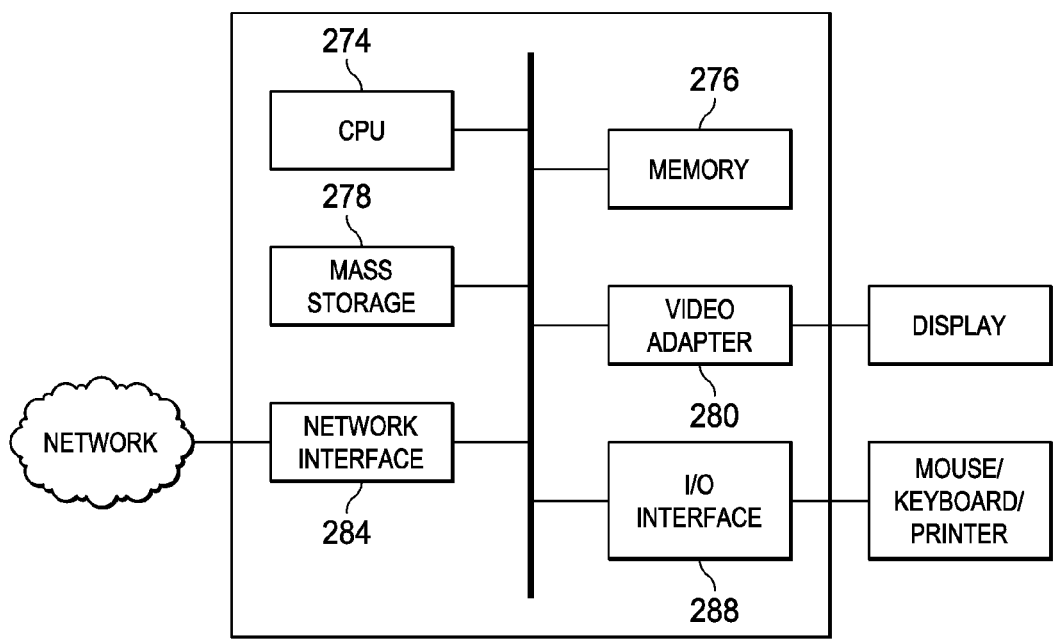
FIG. 19 illustrates a block diagram of an embodiment general-purpose computer system.

FIG. 19 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for controlling multiple wireless access nodes, the method comprising:
   receiving, by a central controller from a base station (BS), a message indicating a channel state information (CSI), wherein the central controller is a cloud controller for a cloud random access network (RAN);
   retrieving, from a database, a plurality of channel information;
   determining a state transition function in accordance with the message and the plurality of channel information;
   determining a belief state in accordance with the state transition function;

determining cooperation for a plurality of BSs comprising the BS in accordance with the belief state to produce a cooperation decision; and transmitting, by the central controller to the BS, the cooperation decision.

2. The method of claim 1, wherein the cooperation decision is a rate decision.

3. The method of claim 1, wherein the cooperation decision is a power level decision.

4. The method of claim 1, wherein the cooperation decision is a clustering decision.

5. The method of claim 1, wherein determining the state transition function comprises utilizing a finite state Markov chain (FSMC).

6. The method of claim 1, wherein the message comprises the CSI and a CSI delay, wherein determining the state transition function comprises determining the state transition function in accordance with the CSI and the CSI delay.

7. The method of claim 1, wherein the plurality of channel information corresponds to a plurality of UE locations and a plurality of UE speeds.

8. The method of claim 1, wherein the message comprises an FSMC state index, wherein determining the state transition function comprises determining the state transition function in accordance with the FSMC state index.

9. The method of claim 1, wherein the message comprises the state transition function.

10. The method of claim 1, wherein the message comprises an observation function, wherein determining the belief state comprises determining the belief state in accordance with the observation function.

11. The method of claim 1, wherein determining the belief state comprises:
determining a number of delay steps; and
determining the belief state in accordance with the number of delay steps.

12. The method of claim 1, wherein determining the belief state comprises determining the belief state in accordance with a previous belief distribution.

13. The method of claim 1, wherein determining cooperation comprises utilizing a greedy policy.

14. The method of claim 1, wherein determining cooperation comprises approximating an outage probability in accordance with the belief state.

15. A method for controlling multiple wireless access nodes, the method comprising:
receiving, by a network element from a central cloud controller, model information;
retrieving, by the network element from a database, a plurality of channel information corresponding to a plurality of user equipment (UE) locations and a plurality of UE speeds;
determining a state transition function in accordance with the model information and the plurality of channel information; and
transmitting, by the network element to the central cloud controller, a message comprising the state transition function.

16. The method of claim 15, wherein the model information comprises a delay and modeling method and a number of channel states.

17. The method of claim 15, further comprising determining an observation function, wherein the message further comprises the observation function.

18. The method of claim 15, wherein the network element is a user equipment(UE).

19. The method of claim 15, wherein the network element is a base station (BS).

20. The method of claim 19, further comprising measuring a channel between the BS and a UE to produce a measured channel, wherein determining the state transition function comprises determining the state transition function in accordance with the measured channel.

21. The method of claim 19, further comprising:
generating a finite state Markov chain (FSMC) state index; and
transmitting, by the BS to the central controller, the FSMC state index.

22. The method of claim 19, further comprising:
receiving, by the BS from the central controller, a cooperation decision;
setting cooperation in accordance with the cooperation decision;
receiving, by the BS from the central controller, a rate allocation; and
setting a plurality of rates for a plurality of UEs in accordance with the rate allocation.

23. The method of claim 22, wherein the cooperation decision is a rate decision.

24. The method of claim 22, wherein the cooperation decision is a power level decision.

25. The method of claim 22, wherein the cooperation decision is a clustering decision.

26. A central controller comprising:
a processor; and
a non-transitory computer readable storage medium storing programming for execution by the processor, the programming including instructions to
receive, from a base station (BS), a message indicating a channel state information (CSI), wherein the central controller is a cloud controller for a cloud random access network (RAN),
retrieve, from a database, a plurality of channel information;
determine a state transition function in accordance with the message and the plurality of channel information,
determine a belief state in accordance with the state transition function,
determine cooperation for a plurality of BSs comprising the BS in accordance with the belief state to produce a cooperation decision, and
transmit, to the BS, the cooperation decision.

27. A network element comprising:
a processor; and
a non-transitory computer readable storage medium storing programming for execution by the processor, the programming including instructions to receive, from a central cloud controller, model information,
retrieve, from a database, a plurality of channel information corresponding to a plurality of user equipment (UE) locations and a plurality of UE speeds,
determine a state transition function in accordance with the model information and the plurality of channel information, and
transmit, to the central cloud controller, a message comprising the state transition function.

28. The central controller of claim 26, wherein the plurality of channel information corresponds to a plurality of UE locations and a plurality of UE speeds.

* * * * *